United States Patent [19]

Turner

[11] Patent Number: 5,448,936
[45] Date of Patent: Sep. 12, 1995

[54] DESTRUCTION OF UNDERWATER OBJECTS

[75] Inventor: Stanley W. Turner, Covina, Calif.

[73] Assignee: Hughes Aircraft Company, Los Angeles, Calif.

[21] Appl. No.: 294,289

[22] Filed: Aug. 23, 1994

[51] Int. Cl.$^6$ .................. B63G 7/02; G01B 11/00; G01C 3/00
[52] U.S. Cl. ...................... 89/1.13; 89/1.11; 102/402; 102/403; 356/141.1
[58] Field of Search .......... 89/1.11, 1.13, 41.06, 89/41.21; 102/402, 403; 356/5, 141.1

[56] References Cited

U.S. PATENT DOCUMENTS

| | | | |
|---|---|---|---|
| 4,669,809 | 6/1987 | Patry et al. | 356/5 |
| 4,787,291 | 11/1988 | Frohock, Jr. | 89/41.06 |
| 4,862,257 | 8/1989 | Ulich | 358/95 |
| 4,964,721 | 10/1990 | Ulich et al. | 356/5 |
| 5,180,881 | 1/1993 | Wootton et al. | 89/41.06 |
| 5,231,401 | 7/1993 | Kaman et al. | 356/5 |
| 5,243,541 | 9/1993 | Ulich | 356/5 |

OTHER PUBLICATIONS

S. W. Turner, "Airborne Mine Countermeasures Concept", copy of charts shown in presentation on Oct. 24, 1990.

John Boatman, "Lantern used to find Gulf mines," *Jane's Defence Weekly*, Jun. 29, 1991 (p. 1163).

Anon., "Kaman builds Magic Lantern prototypes", *Navy News & Undersea Technology*, Jan. 13, 1992, (pp. 6–7).

Edward J. Walsh, "Bold Approaches Sought in Mine Countermeasures", *Sea Power*, Mar. 1992 (pp. 39–42).

Ove Steinvall et al., "Experimental evaluation of an airborne depth sounding lidar", SPIEE vol. 1714 Lidar for *Remote Sensing*, 1992 (pp. 108–126).

*Primary Examiner*—Charles T. Jordan
*Assistant Examiner*—Theresa M. Wesson
*Attorney, Agent, or Firm*—W. K. Denson-Low

[57] ABSTRACT

An apparatus for destroying a target underwater object includes a targeting system and a gun system. The targeting system has a laser which produces a laser beam, a laser ranging sensor sensitive to reflections of the laser beam from an underwater object, and electronic circuitry that determines the position of a target underwater object using an output signal of the laser ranging sensor. The gun system includes a gimballed gun that fires a projectile and is pointed at the underwater target by the targeting system. The targeting system may be operated to track the projectile in the water as well as the target to be destroyed and to correct the aim of the gun according to the relative position of the target and the projectile.

19 Claims, 4 Drawing Sheets

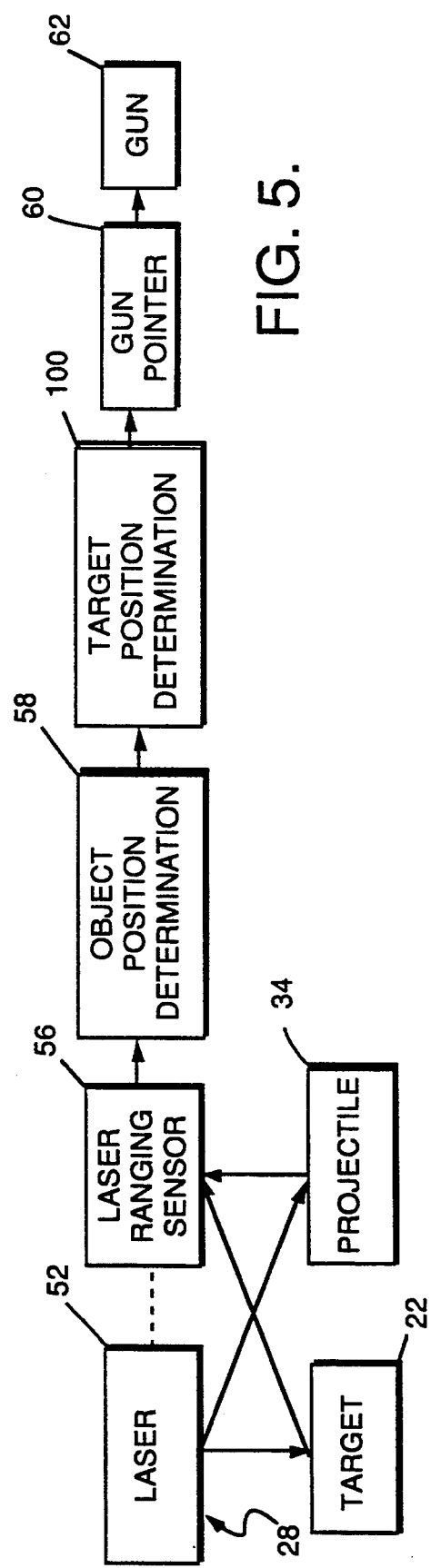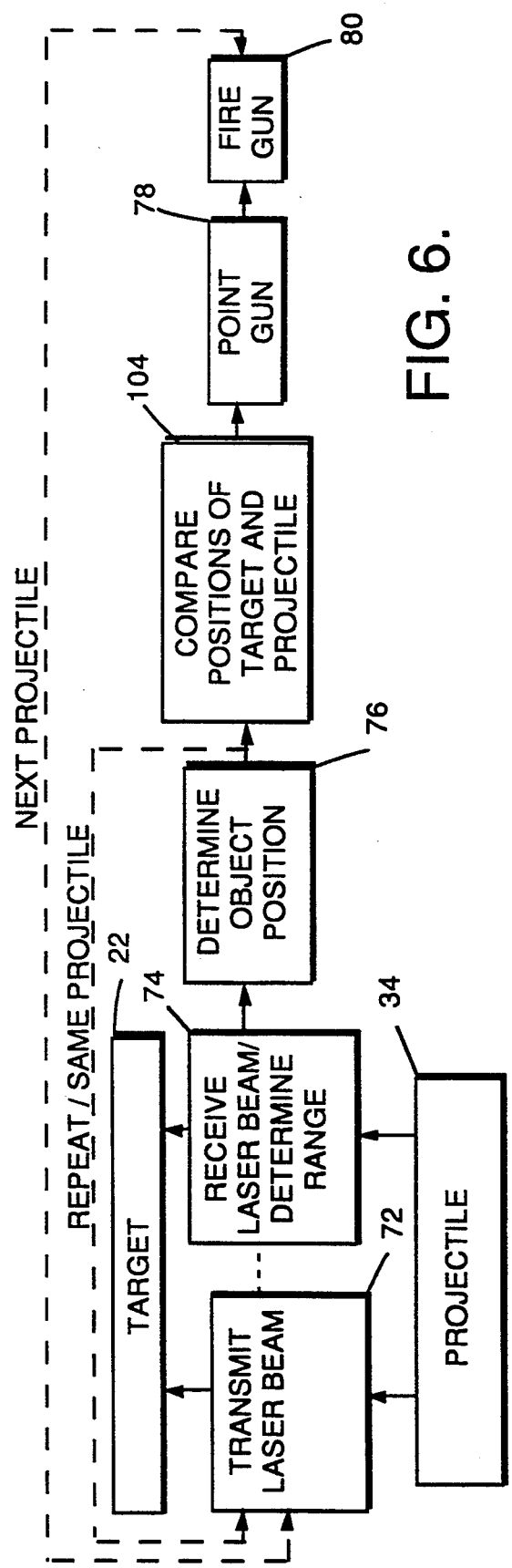

DESTRUCTION OF UNDERWATER OBJECTS

BACKGROUND OF THE INVENTION

This invention relates to the destruction of underwater objects, and, more particularly, to their destruction using a targeting system and gun system located above the water.

In wartime, underwater mines are commonly encountered at invasion beaches and harbor entrances or in shipping lanes. The mines are placed at relatively shallow depths below the water in these locations to destroy ships or at least impede progress by requiring extensive operations to detect and remove the mines. The mines are designed to detect the presence of a ship and to detonate as the ship passes or contacts the mine.

A number of techniques are used to locate underwater mines. Once located, the mines can be avoided or destroyed. In some cases, it may be feasible to temporarily continue operations while avoiding but not destroying the mines. Avoiding densely arranged fields of mines during continuing operations is difficult and time consuming, and therefore mines are usually first located and then, either immediately or sometime thereafter, destroyed.

Several techniques are used to destroy mines. In one, a decoy simulating the signature of a ship is towed by a helicopter or a mine-sweeping vessel over a mine field in an attempt to cause the mine to detonate responsive to the presence of the towed decoy. This technique operates under the assumption that the detonating sensor and discrimination algorithm of the mine can be fooled by the decoy. The microcircuitry of the underwater mine can be programmed with various countermeasures that render this technique somewhat unreliable in practice.

In another approach, the underwater mine is detected by magnetic mapping, sonar sweeps, or other technique. Swimmers or robot vehicles in the water place explosive charges in the vicinity of the mine, and the charges are detonated to destroy the mine or otherwise render it ineffective. This technique is slow and expensive and is also hazardous when swimmers are used.

There is a need for an improved approach to neutralizing the effects of underwater mines. Such an approach should be highly effective, safe in the sense that lives are not endangered in the process of removing the effect of the mine, and as fast and economical as possible. The present invention fulfills this need and further provides related advantages.

SUMMARY OF THE INVENTION

The present invention provides an apparatus and method for locating and destroying underwater objects, generically termed mines. Mines positioned as deep as 20-100 feet can be destroyed. The approach can destroy mines quickly and with a relatively small cost of consumable ordnance per mine. The entire mine-destruction system is readily carried on an above-the-sea platform such as a helicopter. The helicopter is flown sufficiently high and laterally distant from the potential location of a mine that detonation of the mine cannot damage the helicopter.

In accordance with the invention, an apparatus for destroying a target underwater object comprises a targeting system including a laser producing a laser beam and a laser ranging sensor sensitive to reflections of the laser beam from an underwater object and which produces a laser ranging sensor output signal. The targeting system further includes means for determining the position of a target underwater object using the laser ranging sensor output signal, which includes means for compensating for the optical effects of the laser beam passing through air and water in travelling from the laser to the underwater object, and the return to the laser ranging sensor. The apparatus further comprises a gun system including a gun that fires a projectile and means for pointing the gun at the target underwater object responsive to the targeting system.

The laser and laser ranging sensor are preferably mounted together on a gimballed platform that in turn is mounted to a helicopter. The laser preferably produces a blue-green beam at about 0.45-0.55 micrometers wavelength that has good penetration of water. The laser is initially pointed at the target underwater object by conducting sweeps or using information from other sources about the approximate location of individual targets. The helicopter is flown in a path that is laterally separated from the target of interest and is also sufficiently high that any induced explosion of the mine will not damage the helicopter. The means for determining compensates for the optical effects of the laser beam entering the water at an angle, and the reflection leaving the water at an angle to return to the sensor. The means for determining also compensates for the movement and the position of the helicopter.

Once the position of the target underwater object has been established using the targeting system, the projectile-firing gun is aimed at the target responsive to this determination of its position. The gun, which is also preferably mounted on a gimballed platform mounted to the helicopter, is fired to direct projectiles at the target. The projectiles can be made to destroy the target by penetration and explosion of the projectile, penetration and ignition of the explosive carried within the target itself, explosion in proximity to the target, or other destruction mechanism.

In some cases, this open-loop targeting system may be sufficient to destroy targets. In other cases, the projectile fired by the gun may not reach the target even though it is accurately aimed by the targeting system. For example, deflection effects as the projectile enters the water, or underwater currents not apparent when viewed from above the water, may cause it to miss the target. To improve the likelihood that the projectiles will destroy the mine under these conditions, the targeting system may be operated in a closed-loop fashion.

When operated in closed-loop feedback operation, the laser targeting system tracks the target underwater object and also tracks the projectiles as they enter the water and proceeds toward the target. The positions of the target underwater object and the projectiles are compared, and the aim of the gun is corrected responsively. Thus, using a relatively small number of fired projectiles, the gun may be brought on target.

The present approach provides a highly effective, rapid, low-cost approach to clearing individual mines or large numbers of mines from an area. The system is effective to targeting and destroying underwater objects at depths up to 20-100 feet, which constitutes the great majority of mines in most situations. Personnel are not placed at risk in the mine clearing operation.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 5 is a block diagram of the interrelation of the elements of the targeting and gun systems in closed-loop operation; and FIG. 6 is a block flow diagram of the destruction of targets when the system is operated in a closed-loop fashion.

DETAILED DESCRIPTION OF THE INVENTION

Figure 1:
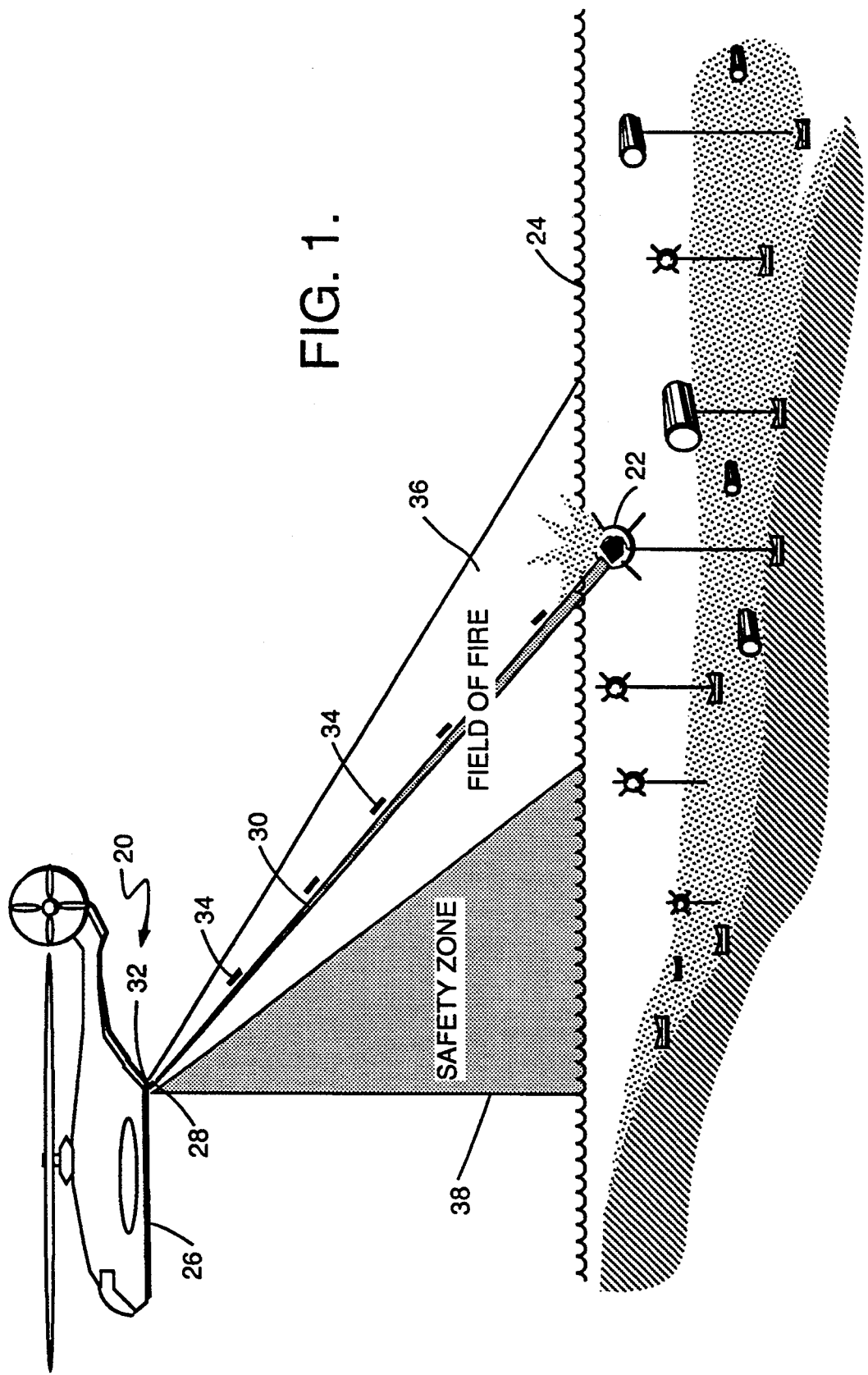
FIG. 1 is a diagrammatic depiction of a mine-clearing system according to the present invention.

FIG. 1 depicts a general view of an apparatus 20 for destroying a target underwater object, in relation to its environment of use. Targets 22 to be destroyed, here depicted as mines, are positioned below the surface 24 of the water. The mines may be of various types, such as anchored mines, floating mines, bottom mines, etc. No distinction is made between these various types of mines for the purposes of the present invention.

The apparatus 20 for destroying the targets is located in a platform above the surface 24, here shown as a helicopter 26. The apparatus 20 includes a targeting system 28 mounted on a controllable gimballed support. The targeting system 28 has a laser that directs a laser beam 30 into the water and a ranging sensor that receives a reflected signal from the target 22. The apparatus 20 includes a gun system 32, also mounted on a controllable gimballed support, which includes a gun that fires projectiles 34 into the water. The targeting system 28 and the gun system 32 may be mounted on the same gimballed support but are preferably mounted on separate supports so that they can be independently directed and so that vibrations produced by the firing of the gun are not transmitted directly into the targeting system.

The helicopter 26 flies over the surface 24 of the water to locate the targets 22 to be destroyed. To be an acceptable candidate, a target must be laterally separated from the helicopter 26, within a designated field of fire 36. The region directly below and a small distance in any direction from the position directly below the helicopter 26 is designated a safety zone 38. Targets are not fired upon when they are in this safety zone 38, as the blast and water spout produced by destruction of the target could damage the helicopter. Thus, if any potential targets are identified below the helicopter in the safety zone 38, the helicopter is moved forward-/backward or laterally until the targets are in the field of fire 36. The inner limit of the field of fire 36 is determined by the distance required to ensure safety of the helicopter, and the outer limit of the field of fire is determined by the maximum effectiveness of the targeting system 28 and the gun system 32.

Figure 2:
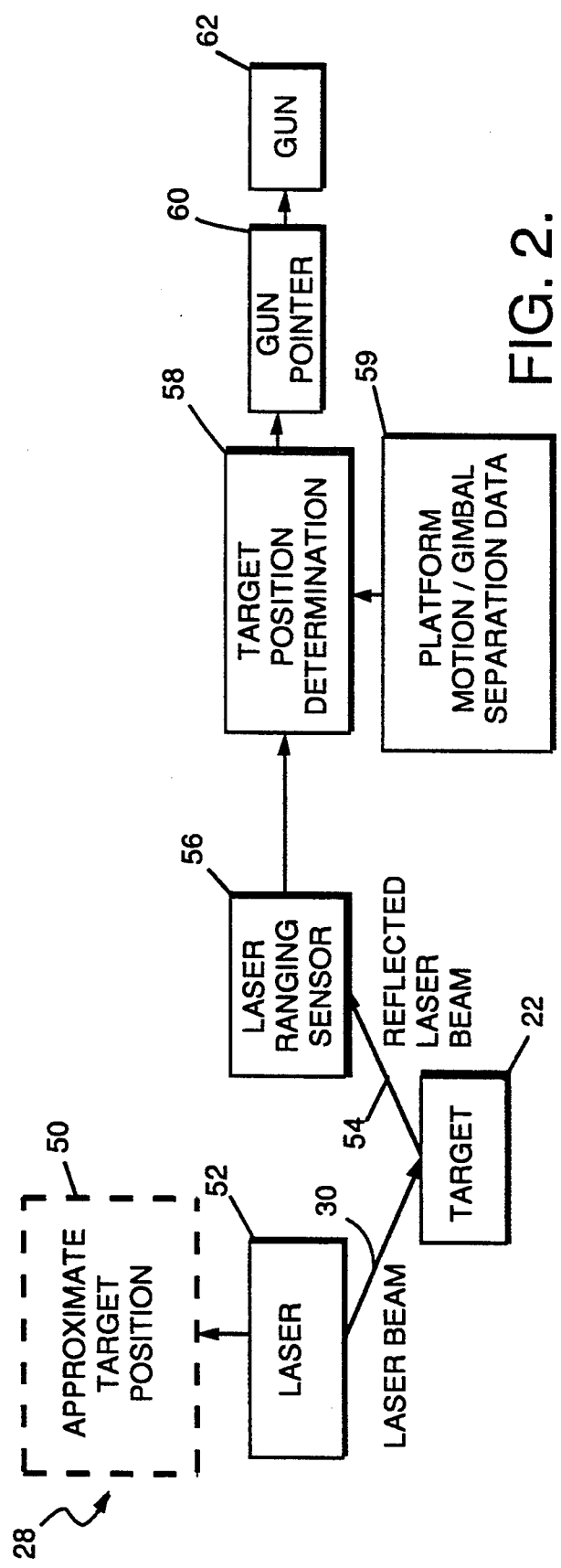
FIG. 2 is a block diagram of the interrelation of the elements of the targeting and gun systems in open-loop operation.
Figure 3:
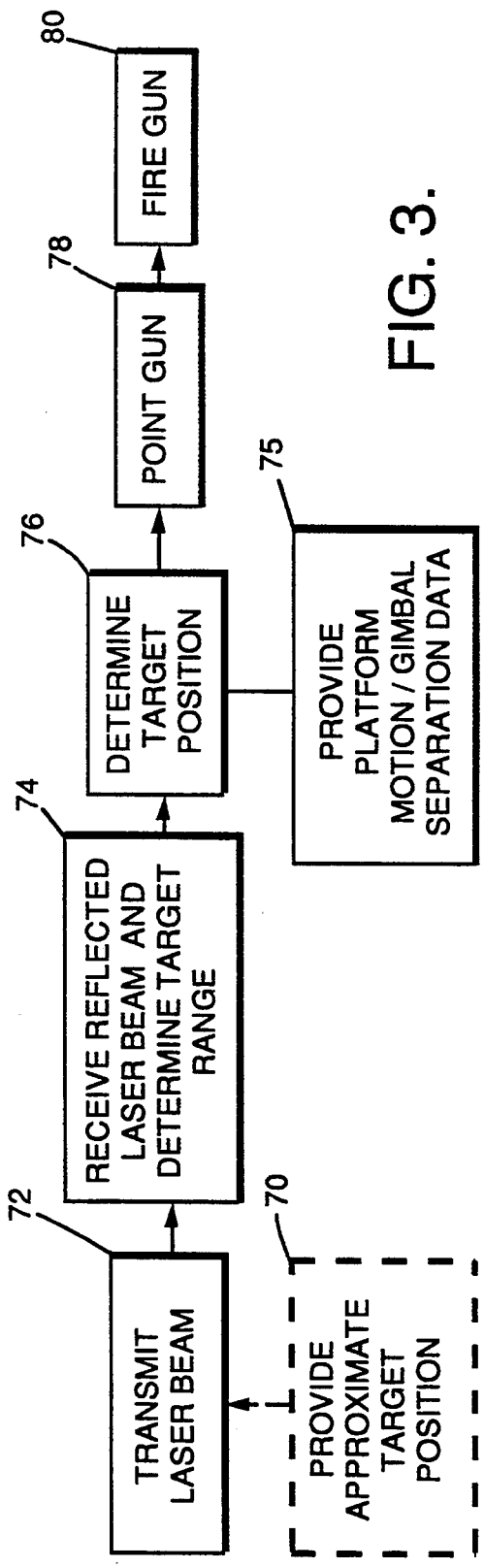
FIG. 3 is a block flow diagram of the destruction of targets when the system is operated in an open-loop fashion.
Figure 4:
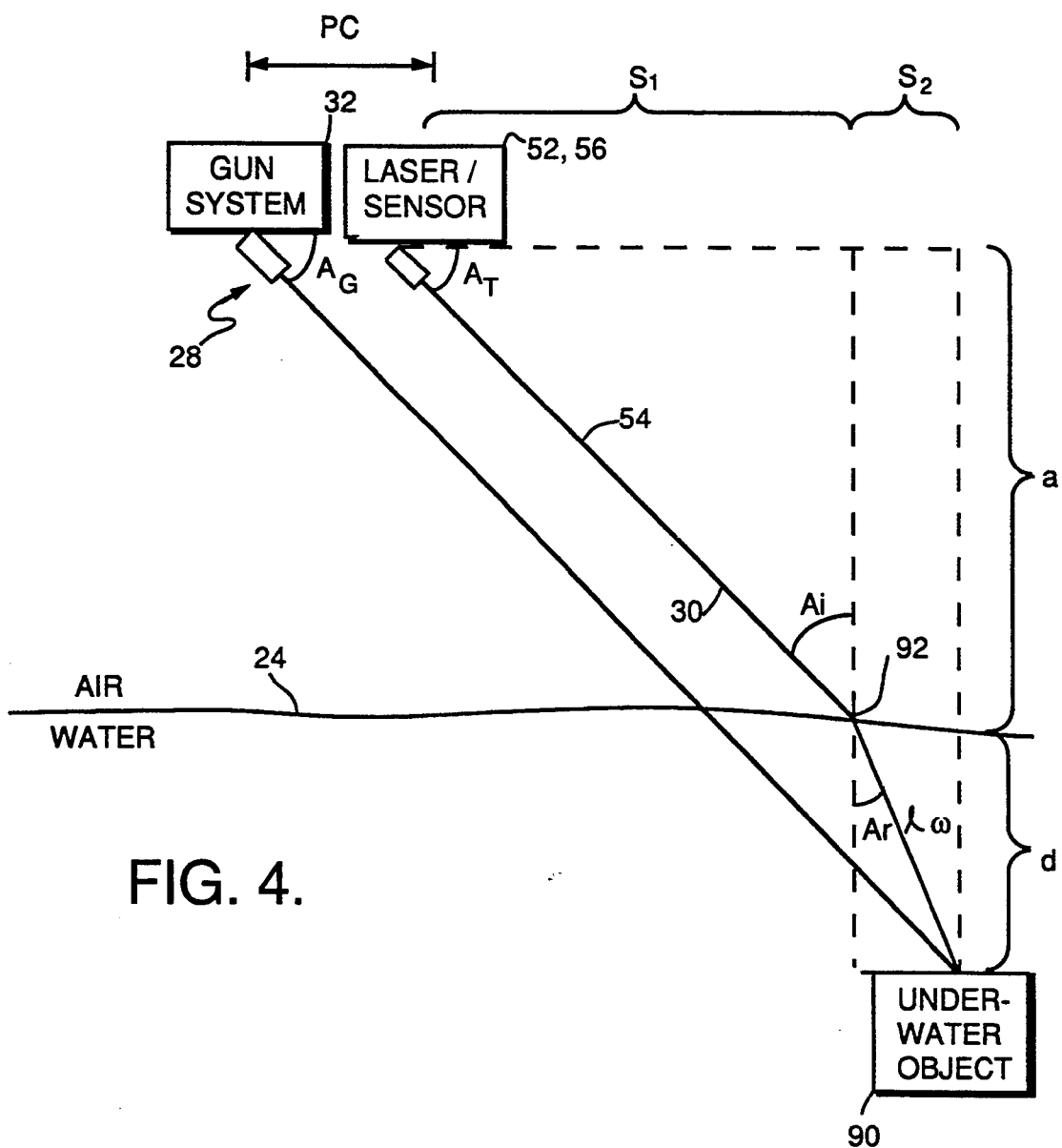
FIG. 4 is a simplified diagram of the geometric relation of the targeting system and gun system with the underwater object.

The apparatus 20 may be operated in an "open loop" fashion or a "closed loop" fashion, and the meanings of these terms will become apparent from the following discussion. FIGS. 2 and 3 depict "open loop" operation, and FIGS. 5 and 6 depict "closed loop" operation. FIG. 4 shows geometric relationships used to determine the position of an underwater object by the targeting system and point the gun at that object, in both modes of operation.

Referring to FIG. 2, the approximate position of targets 22 is initially provided to the apparatus 20, in one of several ways, numeral 50. The targets can be visually sighted or otherwise located by the crew of the helicopter or other persons. A field of targets may have been previously mapped using sweeps with magnetic detection apparatus or sonar apparatus, with the positions coordinated to a standard frame of reference provided by the Global Positioning System. The laser/ranging system of the apparatus (to be described subsequently) can be used in a mapping rather than a targeting mode. Any of these techniques, or any other operable technique, can be used to determine an approximate initial position for seeking each target. However, such approximate locating approaches provide only approximate information, which is not sufficiently precise for controlling the gun system.

The initial information 50 is used to aim a gimballed laser 52 of the targeting system 28 generally in the direction of the target 22. A reflected beam 54 from the target 22 is reflected back to a laser ranging sensor 56 that is part of the apparatus 20. The laser beam 30 typically will not initially strike the target 22, and the laser gimbal is moved in a spiral or other type of search pattern until a reflected beam 54 is received.

The laser 52 and the laser ranging sensor 56 are typically provided as a single packaged unit to detect the distance of an object. Such systems and their principles of operation are known in the art and are widely available. For example, packaged laser ranging systems are now often used by surveyors. The laser 52 and laser ranging sensor 56 of the present invention differ from those used by surveyors in several respects. The laser 52 of the present invention is preferably a blue-green laser operating at a wavelength of about 0.45–0.55 micrometers. Lasers of this type are available commercially. This wavelength of laser radiation has a greater distance of penetration into water than other wavelengths. The depth of penetration of the laser beam into the water with a sufficient return signal for detection depends upon several factors, such as the laser power and the clarity of the water. However, tests show that depth ranges of 20–100 feet can be achieved, depending upon water clarity. The laser 52 also preferably has a beam scanner in the form of a controllable mirror that operates in conjunction with the targeting system gimbal to quickly aim the laser 52 and the laser ranging sensor 56 in any desired direction. The gimbal is used for approximate pointing, and the internal mirror or other means is used for fine-scale adjustments. Such systems are available commercially.

The ranging data and the information on the aiming direction of the laser 52 and laser ranging sensor 56 are provided to a target position determination means 58. Platform motion data for the movement of the helicopter and gimbal separation data are also provided, numeral 59, to the target position determination means 58. That is, the helicopter platform desirably does not move rapidly during this process, but it may be moving slowly either intentionally or due to wind currents or the like. Further, the targeting system 28 and gun system 32 are preferably mounted to the helicopter platform on separate gimbals some fixed distance apart and can point independently at the target. These factors are accounted for with the appropriate trigonometric relationships. The position of the target relative to the gun system 32 is geometrically determined (according to relationships to be discussed subsequently in relation to FIG. 4) and provided to the gun pointer 60 of the gimbal of the gun system 32. A gun 62 of the gun system is fired in the direction provided.

FIG. 3 depicts the process corresponding to the apparatus 20 of FIG. 2, used in open loop mode. The approximate position is provided, numeral 70. The laser beam 30 is transmitted to the target, numeral 72. The reflected laser beam 54 is received by the laser ranging sensor 56 and the range of the target is calculated, numeral 74. The platform motion data and gimbal separation information 59 is provided, and the target position is determined, numeral 76. The gun is pointed at the target, numeral 78, and the gun is fired, numeral 80.

The necessary pointing information for the gun system 32, as shown in FIG. 4, includes the azimuth angle and the depression angle to an underwater object 90, measured from the gun system 32. The diagram of FIG. 4 lies in the azimuth plane and depicts in simplified form the geometric relationships used to determine the depression angle $A_G$ for the gun:

$$A_G = \tan^{-1}(a + d/s_1 + s_2 + PC)$$

The height a of the helicopter, the laser sensor, and the gun system 32 above the water surface 24 is known from independent measurements using, for example, a precision radar altimeter in the helicopter 26.

As shown in FIG. 4, the laser beam 30 and reflected beam 54 (which travel along the same ray path) do not travel along a straight line from the targeting system 28 to the object 90. Instead, the light beams refract as they pass between the air and the water, as determined by Snell's Law. According to this relation, $\sin A_i / \sin A_r$ is equal to the refraction index of air/water, which is about 1.33. Here, $A_i$ is the angle of incidence of the laser beam 30, equal in degrees to $90 - A_T$ (the measured angle of depression of the laser/sensor 52, 56), and $A_r$ is the angle of refraction. From these relations, $A_r$ is determined.

The water path distance $1_w$ is determined by the water ranging capability of the laser/sensor 52, 56. The water depth d of the underwater object 90 is $1_w \cos A_r$. The lateral offset $s_2$ of the entry point 92 from the underwater object 90 is $1_w \sin A_r$. The lateral offset $s_1$ of the entry point 92 from the laser/sensor 52, 56 is $a \tan A_T$. PC is the position correction factor to account for the separation in position of the gun gimbal of the gun system 32 from the sensor gimbal of the laser/sensor 52, 56. This distance PC is fixed and is measured at the time of installation of the apparatus 20 into the helicopter.

The azimuth pointing angle may be set at 0, as illustrated in FIG. 4, by orienting the helicopter so that the gun gimbal, the laser/sensor gimbal, and the underwater object all lie in the same plane. Alternatively, the gun gimbal can be slaved to the laser/sensor gimbal to establish the approximate azimuth angle, and a calculation like that shown in FIG. 4 performed to establish the exact azimuth angle.

All of these calculations can be made nearly instantaneously using a microcomputer built into the targeting system 28. Other approaches for determining the position of the object 90 can also be used, as appropriate.

The apparatus 20 can be operated according to this open loop approach discussed in relation to FIGS. 2-4, and, in theory, the projectile 34 fired from the gun 62 will reach the target. However, in practice many other considerations can adversely affect whether the projectile will reach the target when the system is operated in the open loop mode. Errors can be made in the determination of the position of the target due to wave or current motion. Even where no such errors are made, the projectile does not travel in a perfectly straight line in its flight above the water, particularly if there are strong winds. The path of the projectile is likely to be deflected from a straight line when it enters the water. Underwater, currents in the water can deflect the path of the projectile. It is preferred that the projectile fired by the gun not have its own internal guidance system (i.e., a smart projectile), to minimize the cost of each projectile and the total disposable cost of destroying each target.

To improve the targeting of the projectiles against the underwater targets, a closed loop targeting system has been developed and is depicted in FIGS. 5 and 6. For the most part and with one exception, the basic elements of the closed loop system are the same as those of the open loop system described in FIGS. 2 and 3, and the same numbering of the respective elements has been utilized in FIGS. 5 and 6.

The essence of the closed loop system is that the path of the projectile 34 is tracked by the targeting system 28, in addition to the tracking of the target 22. The positions are compared, and the gun pointing is altered to reduce the difference in the positions of the target and the projectile when the projectile reaches the depth of the target until that difference becomes zero or nearly zero.

Referring to FIG. 5, the laser 52, laser ranging sensor 56, and determination means 58 of the targeting system 28 are operated to determine the position of the target 22. The information is provided to the gun pointer 60, and a projectile 34 is fired. After the projectile is fired, the laser 52 and laser ranging sensor 56 are used to determine the position of the projectile 34 (schematically depicted by the alternative ray paths to the projectile 34 in FIG. 5) in exactly the same manner as previously described. The projectile typically travels at 1000–4000 feet per second, which is quite slow compared with the speed of light. The projectile therefore essentially is stationary for each positional snapshot made by the targeting system to determine the position of the projectile. The same geometric relationships discussed with respect to FIG. 4 are used to find the straight line angle of depression of the projectile relative to the horizon, as are used to find the straight line angle of depression of the target. The position of the projectile 34 is tracked until it reaches the same depth d as the target 22, and the depression angles of the target and the projectile are determined. These values are compared, numeral 100. The gun point 60 of the gun system gimbal is adjusted so as to reduce the value of the difference in position of the target and the projectile, and another projectile is fired. The targeting system 28 functions so rapidly that nearly continuous tracking of the positions of the target and each fired projectile can be accomplished.

FIG. 6 depicts the method of this mode of operation so that its closed loop nature is clear. Again, process steps similar to those depicted in FIG. 3 are assigned the same numbering and the respective description is incorporated here. The target location is determined in the manner described previously using the targeting steps 72, 74, and 76, as applied to the target 22. After a first projectile is fired, the targeting steps 72, 74, and 76 are repeated, but in this instance to determine the position of the projectile 34. The position determination of each projectile 34 is repeated (as indicated by the line "Repeat/Same Projectile") until the position of the projectile 34 at the same depth d as the target 22 is determined. The positions of the target and the projectile are compared, numeral 104. The pointing of the gun is corrected so as to reduce the difference in position, numeral 78, and another projectile is fired, numeral 80. The position determination and position comparisons are repeated for each projectile (as indicated by the line "Next Projectile"), until the last-fired projectile is brought into impact with the target. Thus, this mode of operation is "closed loop" in the sense that the path of each projectile is used in improving the aim of the gun so that the next projectile will pass closer to the target, until the target is destroyed. In practice, salvos of projectiles are fired and tracked, so that convergence of the projectiles and the target can be rapidly achieved.

Calculations for the closed loop mode, based upon realistic assumptions for the targeting and destruction of an underwater mine, suggest that in a typical case the firing of about 50 projectiles achieves a probability of destruction of a mine target of about 95 percent.

The present invention provides an important advance in the art of destruction of underwater targets such as mines. The mines are destroyed with minimal risk to personnel and equipment and at a modest cost. Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. Apparatus for destroying a target underwater object, comprising:
    a targeting system including
        a laser producing a laser beam,
        a laser ranging sensor sensitive to reflections of the laser beam from an underwater object, the laser ranging sensor producing a laser ranging sensor output signal, and
        means for determining the position of a target underwater object using the laser ranging sensor output signal, the means for determining including means for compensating for the optical effects of the laser beam passing through air and water in travelling between the laser, the underwater object, and the laser ranging sensor; and
    a gun system including
        a gun that fires a projectile, and
        means for pointing the gun at the target underwater object, the means for pointing operating responsive to the targeting system.

2. The apparatus of claim 1, wherein the laser produces a laser beam having a wavelength of from about 0.45 to about 0.55 micrometers.

3. The apparatus of claim 1, wherein the means for compensating includes means for calculating a refraction effect of the laser beam passing between air and water.

4. The apparatus of claim 1, wherein the means for determining further includes
    means for receiving an approximate target underwater object location from an external source.

5. The apparatus of claim 1, wherein the means for determining further includes
    means for scanning the laser and the laser ranging sensor to find an approximate target underwater object location.

6. The apparatus of claim 1, wherein the targeting system further includes
    a movable platform upon which the laser and the laser ranging sensor are mounted.

7. The apparatus of claim 1, further including
    a helicopter in which the targeting system and the gun system are supported.

8. Apparatus for destroying a target underwater object, comprising:
    a targeting system including
        a laser producing a laser beam,
        a laser ranging sensor sensitive to reflections of the laser beam from an underwater object, the laser ranging sensor producing a laser ranging sensor output signal,
        means for determining the position of a target underwater object using the laser ranging sensor output signal, the means for determining including means for compensating for the optical effects of the laser beam passing through air and water in travelling between the laser, the underwater object, and the laser ranging sensor, and
        means for pointing the laser and the laser ranging sensor at an apparent position of the target underwater object, the means for pointing the laser and the laser ranging sensor operating responsive to the means for determining; and
    a gun system including
        a gun that fires a projectile, and
        means for pointing the gun at the target underwater object, the means for pointing operating responsive to the targeting system.

9. The apparatus of claim 8, wherein the laser produces a laser beam having a wavelength of from about 0.45 to about 0.55 micrometers.

10. The apparatus of claim 8, wherein the means for compensating includes means for calculating a refraction effect of the laser beam passing between air and water.

11. The apparatus of claim 8, wherein the means for determining further includes
    means for receiving an approximate target underwater object location from an external source.

12. The apparatus of claim 8, wherein the means for pointing includes
    means for scanning the laser to find an approximate target underwater object location.

13. Apparatus for destroying underwater objects, comprising:
    a targeting system including
        a laser producing a laser beam,
        a laser ranging sensor sensitive to reflections of the laser beam from an underwater object, the laser ranging sensor producing a laser ranging sensor output signal,
        means for determining the position of the underwater object using the laser ranging sensor output signal, the means for determining including means for compensating for the optical effects of the laser beam passing through air and water in travelling between the laser, the underwater object, and the laser ranging sensor, and means for comparing the positions of a target underwater object and a projectile underwater object using the output of the means for determining operating separately on the target underwater object as the underwater object and the projectile underwater object as the underwater object; and a gun system including a gun that fires a projectile, and means for pointing the gun at the target underwater object, the means for pointing operating responsive to the means for comparing.

14. The apparatus of claim 13, wherein the laser produces a laser beam having a wavelength of from about 0.45 to about 0.55 micrometers.

15. The apparatus of claim 13, wherein the means for compensating includes means for calculating a refraction effect of the laser beam passing between air and water.

16. The apparatus of claim 13, wherein the targeting system further includes a movable platform upon which the laser and the laser ranging sensor are mounted, and means for pointing the laser and the laser ranging sensor at an apparent position of the underwater object by moving the movable platform, the means for pointing the laser and the laser ranging sensor operating responsive to the targeting system.

17. The apparatus of claim 13, wherein the means for determining further includes means for receiving an approximate target underwater object location from an external source.

18. The apparatus of claim 13, wherein the means for determining further includes means for scanning the laser and the laser ranging sensor to find an approximate target underwater object location.

19. A process for destroying a target underwater object, comprising the steps of:

producing a laser beam, receiving reflections of the laser beam from an underwater object;

determining the position of a target underwater object using the reflections of the laser beam from the underwater object, the step of determining including a step of compensating for the optical effects of the laser beam in passing through air and water;

providing a gun system that fires a projectile; and firing the gun at the target underwater object responsive to the position of the target underwater object as established in the step of determining.

* * * * *